United States Patent
Mo et al.

(10) Patent No.: US 9,638,231 B2
(45) Date of Patent: May 2, 2017

(54) DETACHABLE FIXING MECHANISM AND RELATED ELECTRONIC DEVICE

(71) Applicant: Wistron Corporation, New Taipei (TW)

(72) Inventors: Han-Jun Mo, New Taipei (TW); Chong-Xing Zhu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/609,440

(22) Filed: Jan. 30, 2015

(65) Prior Publication Data

US 2016/0091136 A1 Mar. 31, 2016

(30) Foreign Application Priority Data

Sep. 29, 2014 (CN) ..................... 2014 2 0567992 U (51) Int. Cl.
*F16B 19/02* (2006.01)
*H01R 13/74* (2006.01)
(Continued)

(52) U.S. Cl.
CPC .............. *F16B 19/02* (2013.01); *G06F 1/187* (2013.01); *G11B 33/128* (2013.01); *H01R 13/745* (2013.01)

(58) Field of Classification Search
CPC ........ F16B 5/0241; F16B 19/02; F16B 21/18; F16B 43/005; Y10T 24/44026; Y10T 24/44573; Y10T 24/45262; Y10T 24/45267; H01R 13/73; H01R 13/74; H01R 13/741

USPC ....... 439/347, 373, 565, 570; 248/689, 27.3, 248/220.21, 222.13, 224.51, 224.7, 248/226.12; 411/539, 522; 361/679.01, 361/379.02, 727–727, 679.55–679.58,
(Continued)

(56) References Cited

U.S. PATENT DOCUMENTS

1,038,664 A * 9/1912 Schell ..................... F16B 37/02
16/DIG. 39
2,328,757 A * 9/1943 Tinnerman .............. F24C 15/12
126/114
(Continued)

*Primary Examiner* — Jonathan Liu
*Assistant Examiner* — Guang H Guan
(74) *Attorney, Agent, or Firm* — Winston Hsu; Scott Margo (57) ABSTRACT

A detachable fixing mechanism and a related electronic device can be used to fix an object on a bracket. The detachable fixing mechanism includes a positioning pin and an actuating component. The positioning pin is disposed on the bracket, and includes a supporter whereon an annular sunken slot is formed. The supporter can pierce through an opening on the object. The actuating component includes a constraining slab portion and a contacting slab portion. The constraining slab portion includes a first engaging structure engaged with the annular sunken slot to constrain a movement between the positioning pin and the actuating component. The contacting slab portion flexibly bends from the constraining slab portion. The contacting slab portion includes a second engaging structure connected to the first engaging structure and slidably disposed on the supporter. The contacting slab portion can move relative to the supporter to press the object on the bracket.

11 Claims, 8 Drawing Sheets

(51) Int. Cl.
*G06F 1/18* (2006.01)
*G11B 33/12* (2006.01)

(58) Field of Classification Search
USPC ....... 361/752, 730, 740, 747, 759, 741, 756, 361/754, 755, 785, 786, 788, 789, 801, 361/802, 807, 719; D8/395; D20/43
See application file for complete search history.

(56) References Cited

U.S. PATENT DOCUMENTS

| | | | | |
|---|---|---|---|---|
| 2,352,392 A * | 6/1944 | Kost | ................ | F16B 21/09 24/704.1 |
| 2,358,837 A * | 9/1944 | Tinnerman | .............. | F16B 15/06 411/529 |
| 3,123,880 A * | 3/1964 | Barry et al. | .............. | F16B 5/10 411/175 |
| 3,459,096 A * | 8/1969 | Parkin | .................... | F16B 5/065 411/523 |
| 4,226,393 A * | 10/1980 | Rardin | .................. | H02B 1/044 174/58 |
| 4,243,086 A * | 1/1981 | Kuttler | ................. | F16B 37/043 411/174 |
| 4,623,050 A * | 11/1986 | Copp | .................... | F16D 65/091 188/250 F |
| 4,647,263 A * | 3/1987 | Macfee, Jr. | ........... | F16B 37/048 411/174 |
| 4,980,800 A * | 12/1990 | Furuta | ................ | E05B 47/0002 200/50.01 |
| 5,116,242 A * | 5/1992 | Scotti | .................... | H02G 3/18 411/522 |
| 5,695,296 A * | 12/1997 | Miura | .................... | B60R 19/24 403/2 |
| 5,883,782 A * | 3/1999 | Thurston | ............. | H01L 23/4006 257/718 |
| 5,979,025 A * | 11/1999 | Horng | ................. | H01L 23/4093 165/80.3 |
| 6,008,990 A * | 12/1999 | Liu | .................... | H01L 23/4093 165/80.3 |
| 6,017,226 A * | 1/2000 | Jeffries | .................. | H05K 7/142 361/679.27 |
| 6,046,905 A * | 4/2000 | Nelson | .................... | G06F 1/184 257/E23.086 |
| 6,062,354 A * | 5/2000 | Pugh | ...................... | F16D 65/091 188/234 |
| 6,141,220 A * | 10/2000 | Lin | .................... | H01L 23/4093 165/185 |
| 6,343,678 B1 * | 2/2002 | Barbosa | ................ | F16D 65/091 188/340 |
| 6,552,905 B2 * | 4/2003 | Herring | .............. | H01L 23/4006 165/185 |
| 6,688,831 B2 * | 2/2004 | Antonucci | ................ | F16B 5/06 411/550 |
| 6,854,946 B2 * | 2/2005 | Bauer | .................... | F16B 21/09 411/523 |
| 7,568,855 B2 * | 8/2009 | Fitzler | .................. | F16B 21/183 403/315 |
| 7,654,372 B2 * | 2/2010 | Ikeda | .................... | F16D 65/091 188/234 |
| 7,905,695 B2 * | 3/2011 | O Brien | ................. | F16B 39/26 411/149 |
| 8,721,247 B2 * | 5/2014 | Spitz | ..................... | F16B 37/02 411/516 |
| 8,995,132 B2 * | 3/2015 | Kataoka | ............. | H01L 23/4006 165/104.33 |
| 9,291,180 B2 * | 3/2016 | Nakazato | .............. | F16B 5/10 |
| 2005/0101176 A1 * | 5/2005 | Kachlic | ............. | H01R 13/6275 439/352 |
| 2016/0091136 A1 * | 3/2016 | Mo | ........................ | F16B 19/02 248/205.1 |

* cited by examiner

DETACHABLE FIXING MECHANISM AND RELATED ELECTRONIC DEVICE

BACKGROUND OF THE DISCLOSURE

1. Field of the Disclosure

The present disclosure relates to a fixing mechanism and a related electronic device, and more particularly, to a fixing mechanism and a related electronic device capable of fixing an object on a bracket.

2. Description of the Prior Art

Figure 9:
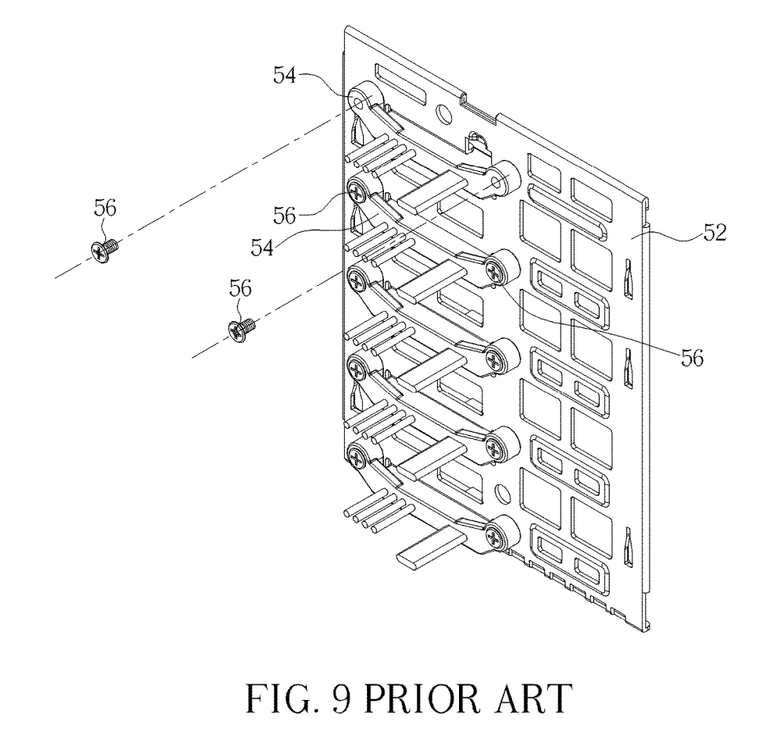
FIG. 9 is an assembly diagram of a frame and a cable connector in prior art.

Please refer to FIG. 9. FIG. 9 is an assembly diagram of a frame 52 and a cable connector 54 in prior art. The frame 52 is utilized to hold a plurality of detachable hard disk drives (not shown in figure). The cable connector 54 is electrically connected to the corresponding detachable hard disk drive for signal transmission. The cable connector 54 is installed on the frame 52 by a fixing component 56, such as the screw or the bolt. An external tool which may be the screwdriver is applied to lock or unlock the fixing component 56 for assembly/disassembly of the cable connector 54 and the frame 52. Conventional combination of the frame 52 and the cable connector 54 is inconveniently executed, the user has to own the external tool otherwise the cable connector 54 cannot be assembled or disassembled from the frame 52. Further, the fixing component 56 is installed on the frame 52 by a thread locking method, and the thread structure of the fixing component 56 is easily damaged after repeated operation. The conventional combination has a drawback of inferior assembly strength.

SUMMARY OF THE DISCLOSURE

The present disclosure provides a fixing mechanism and a related electronic device capable of fixing an object on a bracket for solving above drawbacks.

According to the claimed disclosure, a detachable fixing mechanism capable of fixing an object on a bracket, which includes a positioning pin disposed on the bracket, and an actuating component detachably disposed on the positioning pin. The positioning pin includes a supporter whereon an annular sunken slot is formed, and the supporter is adapted to pierce through an opening on the object. The actuating component includes a constraining slab portion, and a contacting slab portion connected to the constraining slab portion in a flexibly bending manner. The constraining slab portion includes a first engaging structure. The first engaging structure is adapted to engage with the annular sunken slot to constrain a relative movement between the positioning pin and the actuating component. The contacting slab portion includes a second engaging structure which may align with the first engaging structure. The second engaging structure is slidably disposed on the supporter, so that the contacting slab portion moves relative to the supporter to press the object on the bracket.

According to the claimed disclosure, the first engaging structure includes a first area, a second area and a third area connected to each other. The second area is located between the first area and the third area. Dimension of the annular sunken slot is greater than a gap of the second area and smaller than gaps of the first area and the third area.

According to the claimed disclosure, the contacting slab portion includes a first part, a second part and a third part. Two sides of the second part are respectively bent from the first part and the third part. The first part is disposed on the constraining slab portion, and the third part is utilized to press the object.

According to the claimed disclosure, a bending direction of the first part relative to the second part is opposite to a bending direction of the third part relative to the second part.

According to the claimed disclosure, the actuating component further includes a handling slab portion disposed on a side of the constraining slab portion opposite to the contacting slab portion.

According to the claimed disclosure, a guiding structure is formed on an edge of the handling slab portion.

According to the claimed disclosure, an electronic device with detachable function includes a bracket whereon an object is accommodated, and a detachable fixing mechanism capable of fixing the object on the bracket. The detachable fixing mechanism includes a positioning pin disposed on the bracket, and an actuating component detachably disposed on the positioning pin. The positioning pin includes a supporter whereon an annular sunken slot is formed, and the supporter is adapted to pierce through an opening on the object. The actuating component includes a constraining slab portion, and a contacting slab portion connected to the constraining slab portion in a flexibly bending manner. The constraining slab portion includes a first engaging structure. The first engaging structure is adapted to engage with the annular sunken slot to constrain a relative movement between the positioning pin and the actuating component. The contacting slab portion includes a second engaging structure which may align with the first engaging structure. The second engaging structure is slidably disposed on the supporter, so that the contacting slab portion moves relative to the supporter to press the object on the bracket.

According to the claimed disclosure, an operating method utilizes a detachable fixing mechanism to fix an object on a bracket. The detachable fixing mechanism has a positioning pin and an actuating component. The operating method includes installing the positioning pin on the bracket, disposing the object on the positioning pin via an opening of the object, and fitting the actuating component into an annular sunken slot of the positioning pin to contact the actuating component against the object.

The present disclosure forms the annular sunken slot on the supporter of the positioning pin, and the supporter is adapted to pierce through the object to expose the annular sunken slot via the opening on the object. The constraining slab portion of the actuating component can be engaged with the annular sunken slot to constrain a movement of the actuating component relative to the positioning pin. Generally, a length of the object may be greater than a distance between the contacting slab portion and the bracket, and the contacting slab portion can be pressed by the object to approach the constraining slab portion while the actuating component is disposed on the positioning pin. Meanwhile, the resilient recovering force of the contacting slab portion presses the object reversely to ensure the object can be stably buckled between the contacting slab portion and the bracket. For disassembly of the object, the actuating component is upwardly pulled to be separated from the positioning pin, and the object can move through the positioning pin to be disassembled from the bracket. The detachable fixing mechanism and the related electronic device of the present disclosure have advantages of simple structure and easy fabrication, can rapidly assemble and disassemble the object without additional tools and provide stable assembly reliability due to flexible design of the actuating component.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
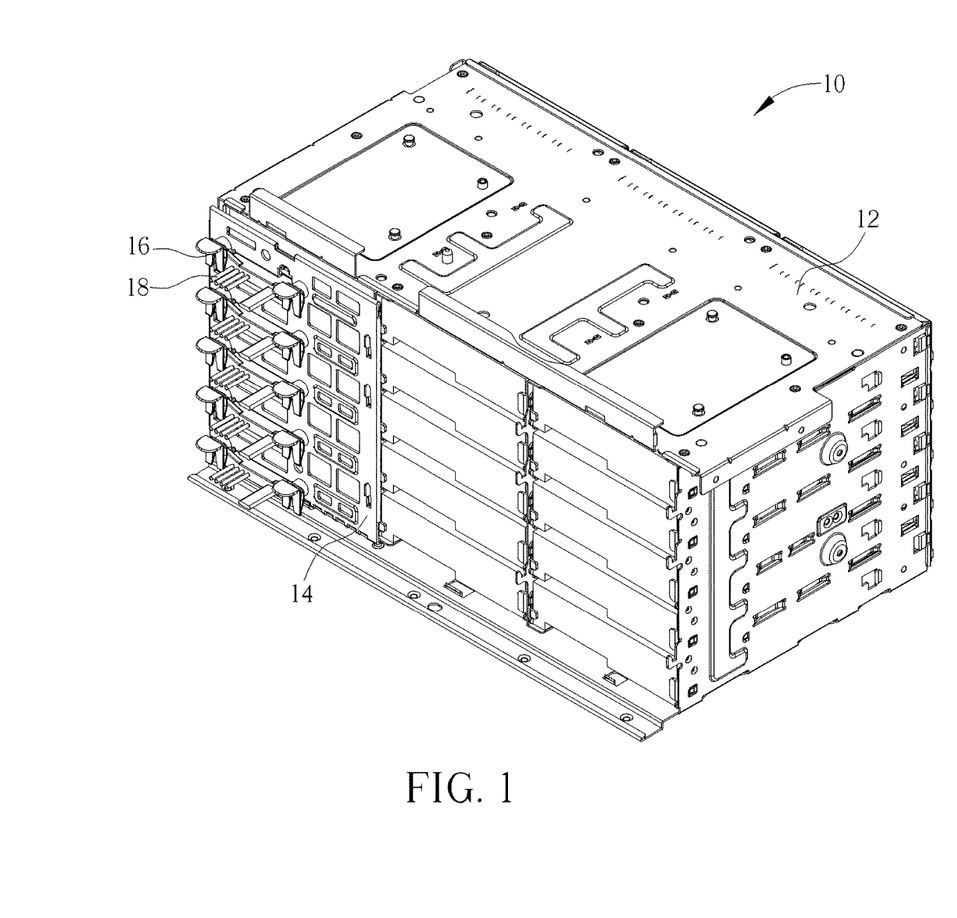
FIG. 1 is a diagram of an electronic device with detachable function according to an embodiment of the present disclosure.

Please refer to FIG. 1. FIG. 1 is a diagram of an electronic device 10 with detachable function according to an embodiment of the present disclosure. The electronic device 10 includes a housing 12, a bracket 14, a detachable fixing mechanism 16 and an object 18. The bracket 14 is installed on a lateral side of the housing 12. At least one or more signal reading apparatuses (such as the detachable hard disk driver and the optical disk driver which are not shown in figures) can be disposed inside the housing 12, so that the electronic device 10 can be a server host. The object 18 can be a cable connector disposed on the bracket 14 to electrically connect to the signal reading apparatus for signal transmission. The detachable fixing mechanism 16 can be utilized to fix the object 18 on the bracket 14 conveniently and rapidly, to prevent the object 18 from being separated from the bracket 14. The object 18 is not limited to the cable connector as mentioned above. Any component having the similar structure and can be assembled and disassembled by the detachable fixing mechanism 16 belongs to a scope of the present disclosure.

As shown in FIG. 1, a plurality of signal reading apparatuses can be disposed inside the housing 12, and a plurality of objects 18 with a related amount is disposed on the bracket 14 accordingly. Each of the objects 18 is electrically connected to the matched signal reading apparatus to establish signal transmission channel. An amount of the detachable fixing mechanism 16 corresponds to an amount of the object 18. In the embodiment of the present disclosure, each object 18 can be matched with two detachable fixing mechanisms 16 which are respectively disposed on two ends of the object 18, and the object 18 can be held by the detachable fixing mechanisms 16 in balance without accidental rotary shake. The amount and disposal of the detachable fixing mechanism 16 are not limited to the above-mentioned embodiment, which depend on design demand.

Figure 2:
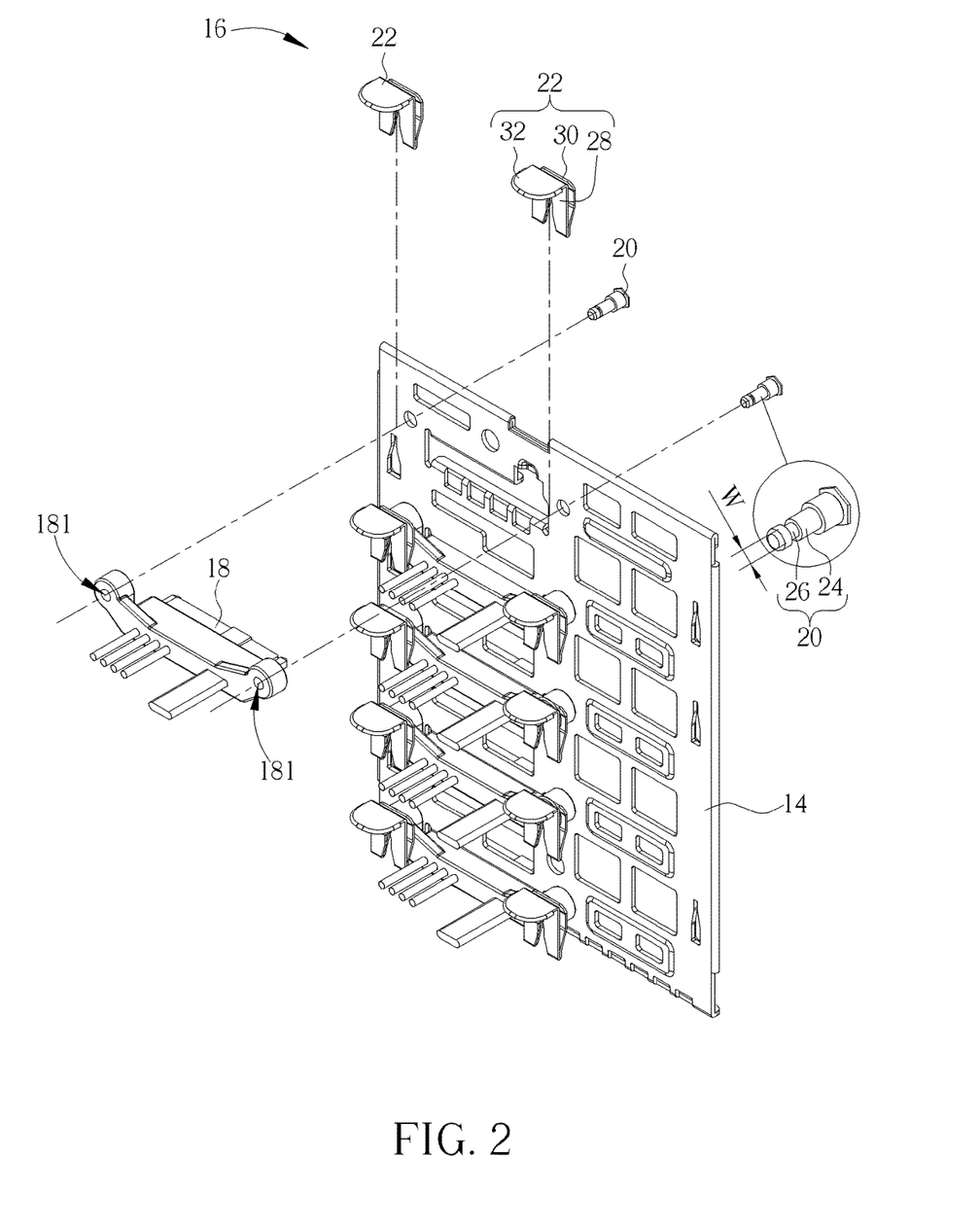
FIG. 2 is an exploded diagram of a detachable fixing mechanism according to the embodiment of the present disclosure.
Figure 3:
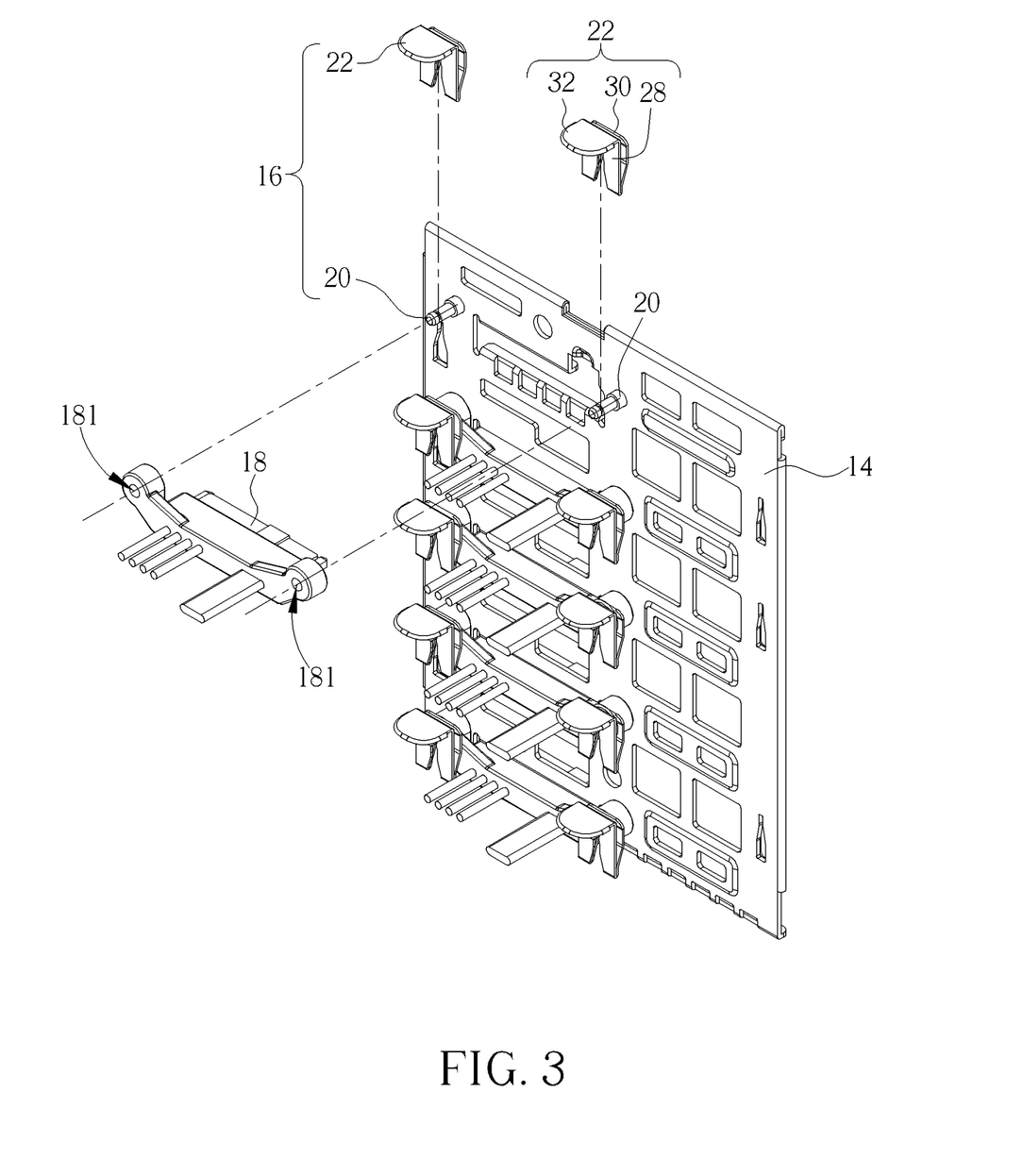
FIG. 3 to FIG. 5 respectively are diagrams of the detachable fixing mechanism in different assembling phases according to the embodiment of the present disclosure.
Figure 4:
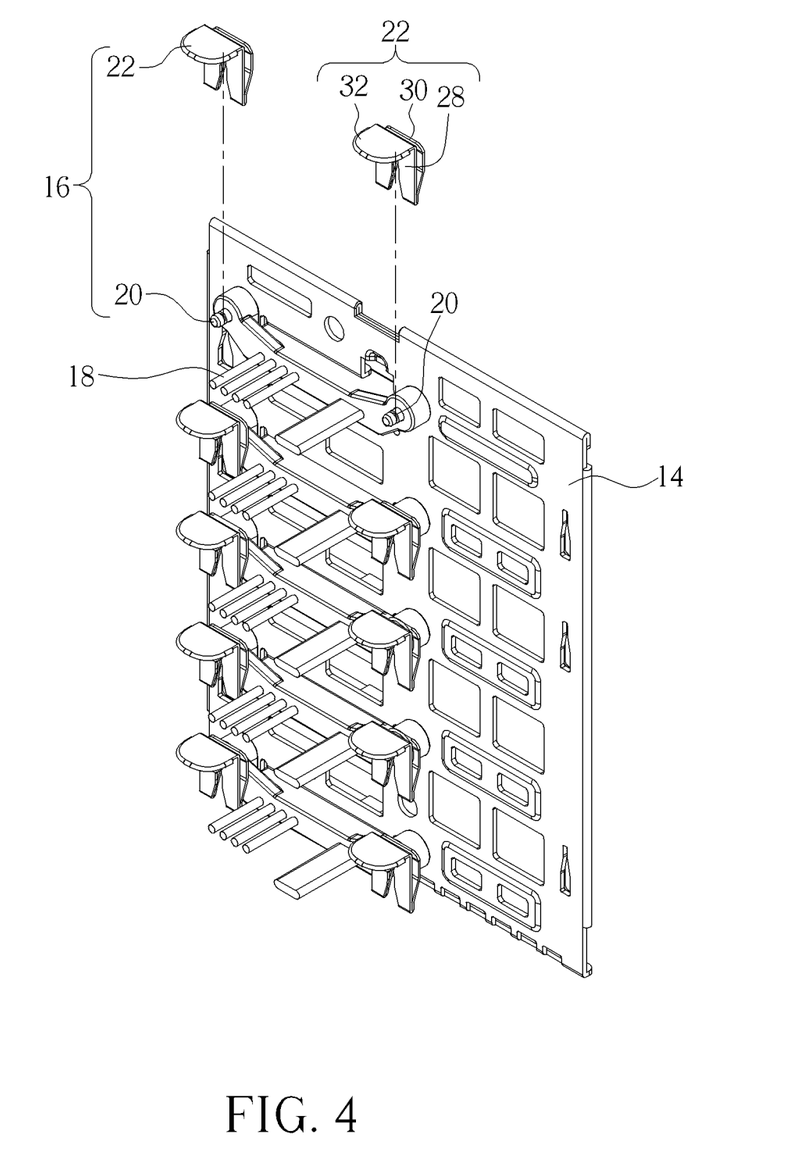
Figure 5:
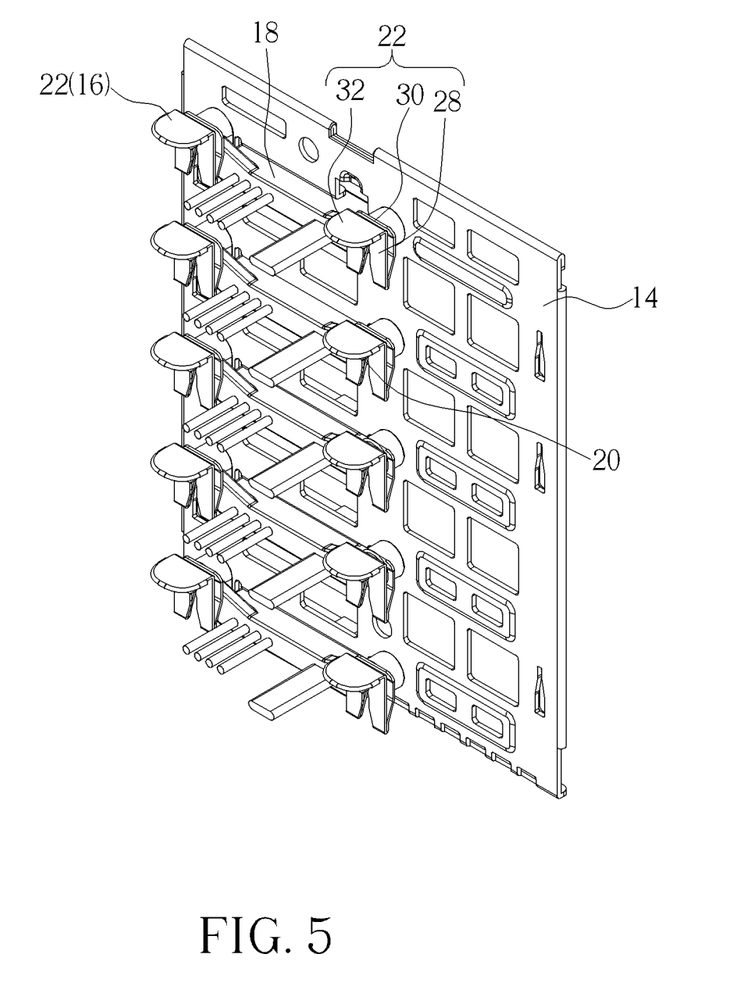

Please refer to FIG. 2 to FIG. 5. FIG. 2 is an exploded diagram of the detachable fixing mechanism 16 according to the embodiment of the present disclosure. FIG. 3 to FIG. 5 respectively are diagrams of the detachable fixing mechanism 16 in different assembling phases according to the embodiment of the present disclosure. The detachable fixing mechanism 16 includes a positioning pin 20 and an actuating component 22. The positioning pin 20 can be disposed on the bracket 14 by a mechanical combining manner such as the screw, the bolt, the rivet and the engagement or by a chemical combining manner such as the adhesive; however, combination between the positioning pin 20 and the bracket 14 is not limited to the above-mentioned manners. The positioning pin 20 includes a supporter 24 and an annular sunken slot 26. The annular sunken slot 26 is formed around an outside surface of the supporter 24. The supporter 24 can pierce through an opening 181 formed on the object 18. The actuating component 22 is detachably disposed on the positioning pin 20, so as to press the object 18 onto the bracket 14 in a resilient deformable manner.

Figure 6:
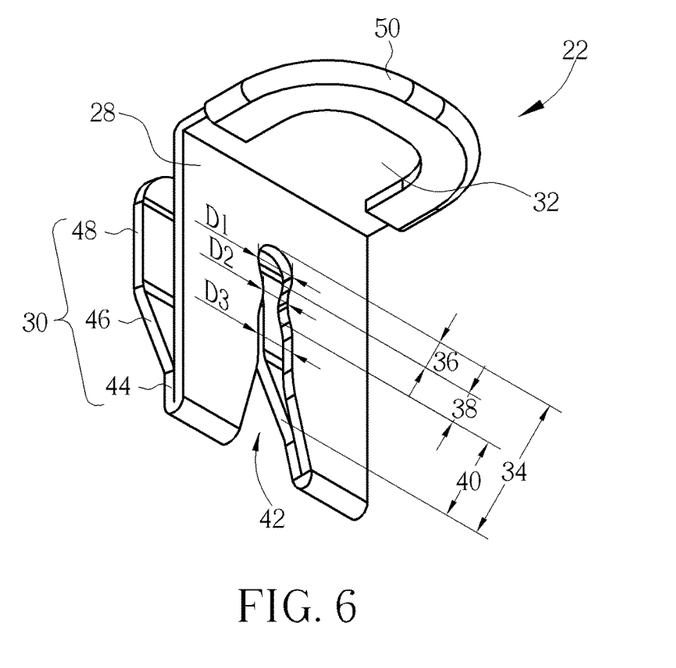
FIG. 6 and FIG. 7 respectively are diagrams of an actuating component in different views according to the embodiment of the present disclosure.
Figure 7:
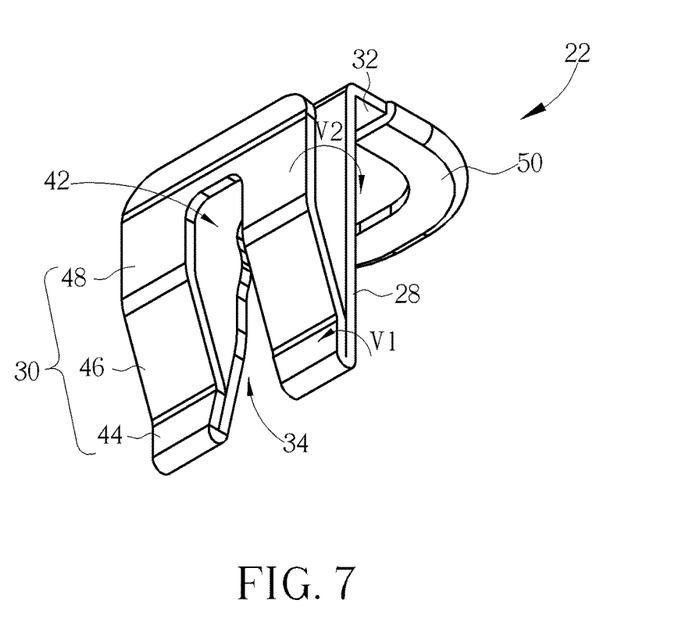

Please refer to FIG. 2, FIG. 6 and FIG. 7. FIG. 6 and FIG. 7 respectively are diagrams of the actuating component 22 indifferent views according to the embodiment of the present disclosure. The actuating component 22 includes a constraining slab portion 28, a contacting slab portion 30 and a handling slab portion 32 flexibly bent from each other. The actuating component 22 is preferably made of metal material. The contacting slab portion 30 and the handling slab portion 32 are respectively disposed on opposite sides of the constraining slab portion 28. The constraining slab portion 28 includes a first engaging structure 34 which can be engaged with the annular sunken slot 26. The first engaging structure 34 inserts into the annular sunken slot 26 to constrain a relative movement between the actuating component 22 and the positioning pin 20. In the meantime, the constraining slab portion 28 is stopped inside the annular sunken slot 26 of the supporter 24, and the contacting slab portion 30 still can move relative to the supporter 24 to press the object 18. The first engaging structure 34 may include a first area 36, a second area 38 and a third area 40 connected to each other. The second area 38 is located between the first area 36 and the third area 40. Dimension W of the annular sunken slot 26 is preferably greater than a gap D2 of the second area 38, and further smaller than a gap D1 of the first area 36 and a gap D3 of the third area 40. When the actuating component 22 is assembled with the positioning pin 20, the annular sunken slot 26 is engaged inside the first area 36 and blocked by the second area 38 to avoid separation. For disassembling the actuating component 22 from the positioning pin 20, the actuating component 22 can be pulled by an external force to move toward the third area 40, and the annular sunken slot 26 can be resiliently deformed to move across the second area 38 so as to be removed from the first engaging structure 34.

The contacting slab portion 30 includes a second engaging structure 42 which is connected to the first engaging structure 34 as an alignment. When the second engaging structure 42 is disposed on the supporter 24, the contacting slab portion 30 can slide relative to the supporter 24 along an axial direction of the supporter 24. The contacting slab portion 30 may include a first part 44, a second part 46 and a third part 48. The first part 44 is disposed on the constraining slab portion 28, and two sides of the second part 46 are respectively bent from the first part 44 and the third part 48. A bending direction V1 (which points toward a left side of the second part 46 shown in FIG.7) of the second part 46 relative to the first part 44 is opposite to a bending direction V2 (which points toward a right side of the second part 46 shown in FIG.7) of the third part 48 relative to the second part 46. An angle of the bending direction V1 is substantially equal to an angle of the bending direction V2, which means the first part 44 is preferably parallel to, but misaligns with, the third part 48. The contacting slab portion 30 can be a dual folded structure, and resilient recovering force is generated by compression of the dual folded structure. The contacting slab portion 30 can move relative to the supporter 24 by the resilient recovering force while the contacting slab portion 30 is slidably disposed on the supporter 24 via the second engaging structure 42, and the third part 48 can resiliently press the object 18 to stably buckle the object 18 between the actuating component 22 and the bracket 14.

In addition, a guiding structure 50 can be optionally formed on an edge of the handling slab portion 32. The external force is applied to the handling slab portion 32 to assemble or disassemble the actuating component 22 and the positioning pin 20. The actuating component 22 is preferably made of metal material, so the guiding structure 50 can be utilized to prevent the user from being hurt by the sharp edge of the handling slab portion 32. The guiding structure 50 can be a curved platform (which is made of metal material) disposed on the edge of the handling slab portion 32, or can be an external cushion (which is made of soft material, such as rubber or sponge) installed on the edge of the handling slab portion 32. Structure and material of the guiding structure 50 are not limited to the above-mentioned embodiment, and depend on design demand.

Figure 8:
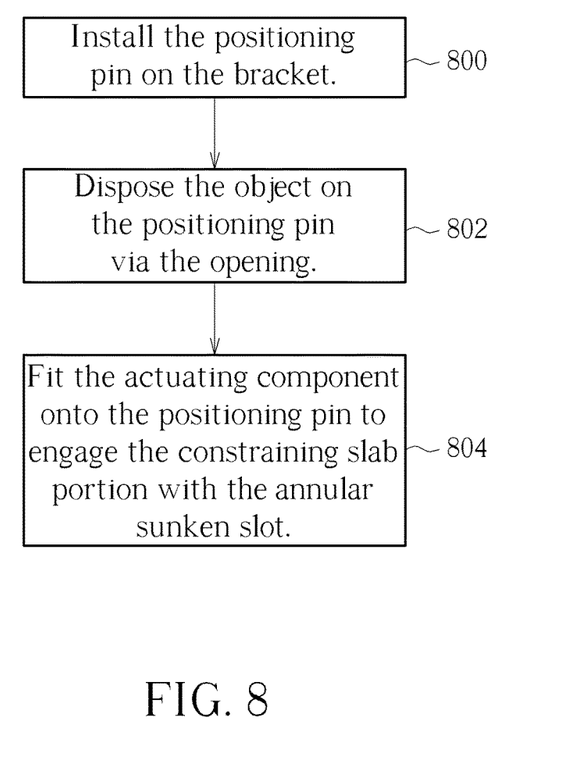
FIG. 8 is a flow chart of an operating method applied to the detachable fixing mechanism according to the embodiment of the present disclosure.

Please refer to FIG. 8. FIG. 8 is a flow chart of an operating method applied to the detachable fixing mechanism 16 according to the embodiment of the present disclosure. The operating method shown in FIG. 8 is suitable for the electronic device 10 and the detachable fixing mechanism 16 shown in FIG. 1 and FIG. 2. First, step 800 is executed to install the positioning pin 20 on the bracket 14. A bottom of the positioning pin 20 can be fixed on the bracket 14 by the screw, the bolt or the rivet. Then, step 802 is executed to dispose the object 18 on the positioning pin 20, and a top of the positioning pin 20 can protrude from the object 18 through the opening 181. It should be mentioned that the annular sunken slot 26 is exposed via the opening 181. Final, step 804 is executed to fit the actuating component 22 onto the positioning pin 20 so as to engage the constraining slab portion 28 with the annular sunken slot 26. Because the contacting slab portion 30 is connected to the constraining slab portion 28 in a flexibly bending manner, the contacting slab portion 30 is pressed by the object 18 to be bent and approach the constraining slab portion 28. The contacting slab portion 30 applies a reaction force to the object 18 accordingly, so that the object 18 can be tightly attached to the bracket 14.

In conclusion, the present disclosure forms the annular sunken slot on the supporter of the positioning pin, and the supporter is adapted to pierce through the object to expose the annular sunken slot via the opening on the object. The constraining slab portion of the actuating component can be engaged with the annular sunken slot to constrain a movement of the actuating component relative to the positioning pin. Generally, a length of the object may be greater than a distance between the contacting slab portion and the bracket, and the contacting slab portion can be pressed by the object to approach the constraining slab portion while the actuating component is disposed on the positioning pin. Meanwhile, the resilient recovering force of the contacting slab portion presses the object reversely to ensure the object can be stably buckled between the contacting slab portion and the bracket. For disassembly of the object, the actuating component is upwardly pulled to be separated from the positioning pin, and the object can move through the positioning pin to be disassembled from the bracket. Comparing to the prior art, the detachable fixing mechanism and the related electronic device of the present disclosure have advantages of simple structure and easy fabrication, can rapidly assemble and disassemble the object without additional tools and provide stable assembly reliability due to flexible design of the actuating component.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A detachable fixing mechanism capable of fixing an object on a bracket, the detachable fixing mechanism comprising:
   a positioning pin comprising a supporter whereon an annular sunken slot is formed, the supporter being adapted to pierce through an opening on the object; and
   an actuating component detachably disposed on the positioning pin, the actuating component comprising:
      a constraining slab portion comprising a first engaging structure, the first engaging structure being adapted to engage with the annular sunken slot to constrain a relative movement between the positioning pin and the actuating component; and
      a contacting slab portion connected to the constraining slab portion in a flexibly bending manner, the contacting slab portion comprising a second engaging structure aligning with the first engaging structure, the second engaging structure being slidably disposed on the supporter so that the contacting slab portion is movable relative to the supporter to press the object toward the bracket, the contacting slab portion comprising a first part, a second part and a third part, two sides of the second part being respectively bent from the first part and the third part, the first part being bent from an edge side of the constraining slab portion and contacting against a lateral surface of the constraining slab portion facing the first part substantially in parallel, the third part being substantially parallel to the first part and utilized to press the object.

2. The detachable fixing mechanism of claim 1, wherein the first engaging structure comprises a first area, a second area and a third area connected to each other, the second area is located between the first area and the third area, a dimension of the annular sunken slot is greater than a gap of the second area and smaller than gaps of the first area and the third area.

3. The detachable fixing mechanism of claim 1, wherein a bending direction of the second part relative to the first part is opposite to a bending direction of the third part relative to the second part.

4. detachable fixing mechanism of claim 1, wherein the actuating component further comprises a handling slab portion disposed on a side of the constraining slab portion opposite to the contacting slab portion.

5. The detachable fixing mechanism of claim 4, wherein a guiding structure is formed on an edge of the handling slab portion.

6. An electronic device with detachable function, comprising:
   a bracket whereon an object is accommodated; and
   a detachable fixing mechanism capable of fixing the object on the bracket, the detachable fixing mechanism comprising:
      a positioning pin disposed on the bracket, the positioning pin comprising a supporter whereon an annular sunken slot is formed, the supporter being adapted to pierce through an opening on the object; and an actuating component detachably disposed on the positioning pin, the actuating component comprising:

a constraining slab portion comprising a first engaging structure, the first engaging structure being adapted to engage with the annular sunken slot to constrain a relative movement between the positioning pin and the actuating component; and a contacting slab portion connected to the constraining slab portion in a flexibly bending manner, the contacting slab portion comprising a second engaging structure aligning with the first engaging structure, the second engaging structure being slidably disposed on the supporter so that the contacting slab portion is movable relative to the supporter to press the object on the bracket, the contacting slab portion comprising a first part, a second part and a third part, two sides of the second part being respectively bent from the first part and the third part, the first part being bent from an edge side of the constraining slab portion and contacting against a lateral surface of the constraining slab portion facing the first part substantially in parallel, the third part being substantially parallel to the first part and utilized to press the object.

7. The electronic device of claim 6, wherein the first engaging structure comprises a first area, a second area and a third area connected to each other, the second area is located between the first area and the third area, a dimension of the annular sunken slot is greater than a gap of the second area and smaller than gaps of the first area and the third area.

8. The electronic device of claim 6, wherein a bending direction of the second part relative to the first part is opposite to a bending direction of the third part relative to the second part.

9. The electronic device of claim 6, wherein the actuating component further comprises a handling slab portion disposed on a side of the constraining slab portion opposite to the contacting slab portion.

10. The electronic device of claim 9, wherein a guiding structure is formed on an edge of the handling slab portion.

11. An operating method of fixing an object on a bracket with a detachable fixing mechanism, the operating method comprising:

obtaining the detachable fixing mechanism, the detachable fixing mechanism comprising:

a positioning in comprising a supporter whereon an annular sunken slot is formed, the supporter being adapted to pierce through an opening on the object; and an actuating component adapted to be detachably disposed on the positioning pin, the actuating component comprising:

a constraining slab portion comprising a first engaging structure, the first engaging structure being adapted to engage with the annular sunken slot to constrain a relative movement between the positioning pin and the actuating component; and a contacting slab portion connected to the constraining slab portion in a flexibly bending manner, the contacting slab portion comprising a second engaging structure aligning with the first engaging structure, the second engaging structure adapted to be slidably disposed on the supporter so that the contacting slab portion is movable relative to the supporter to press the object toward the bracket, the contacting slab portion comprising a first part, a second part and a third part, two sides of the second part being respectively bent from the first part and the third part, the first part being bent from an edge side of the constraining slab portion and contacting against a lateral surface of the constraining slab portion facing the first part substantially in parallel, the third part being substantially parallel to the first part and utilized to press the object;

installing the positioning pin on the bracket;

disposing the object on the positioning pin via the opening of the object; and fitting the actuating component into the annular sunken slot of the positioning pin such that the contacting slab portion moves relative to the supporter to press the object toward the bracket.

* * * * *

UNITED STATES PATENT AND TRADEMARK OFFICE
CERTIFICATE OF CORRECTION

PATENT NO.        : 9,638,231 B2                                    Page 1 of 1
APPLICATION NO.   : 14/609440
DATED             : May 2, 2017
INVENTOR(S)       : Han-Jun Mo et al.

It is certified that error appears in the above-identified patent and that said Letters Patent is hereby corrected as shown below:

On the Title Page

Item (30), Foreign Application Priority Data is changed from "2014 2 0567992 U" to
--2014 2 0567992.1--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*